March 20, 1951     C. L. POSEY     2,545,827
SCRAPING MACHINE
Filed Aug. 21, 1946     2 Sheets-Sheet 2
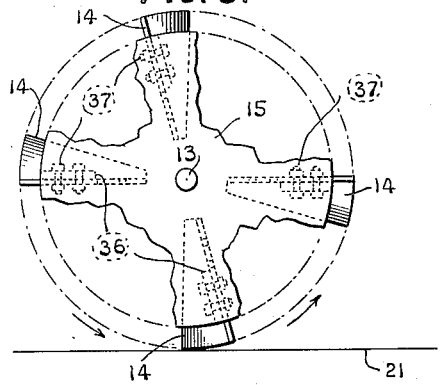
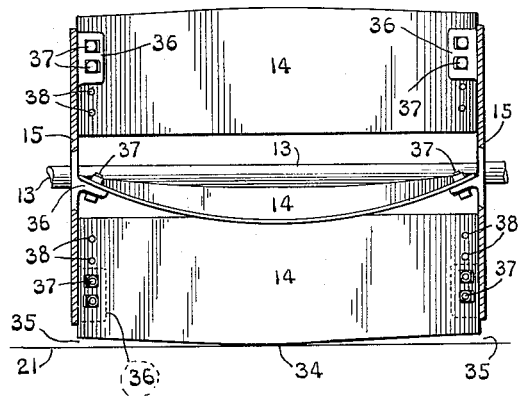
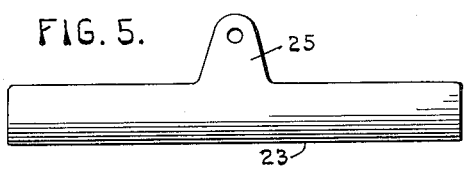
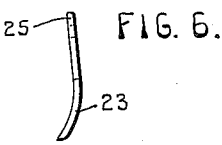
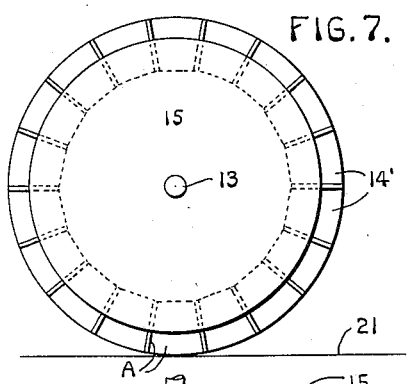
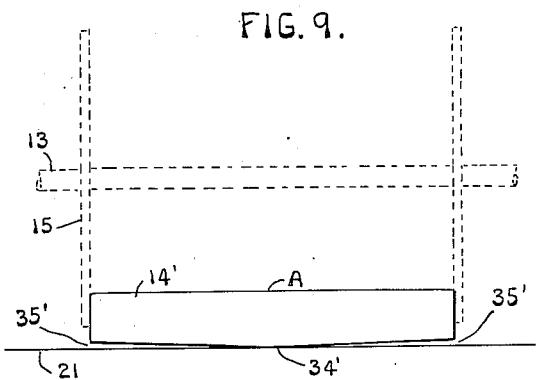
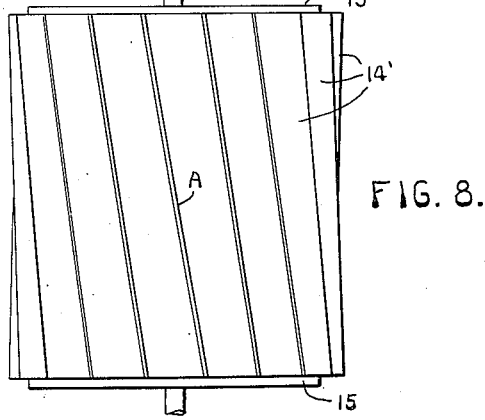
INVENTOR.
C. L. POSEY
BY Albert J. McCauley
ATTORNEY.

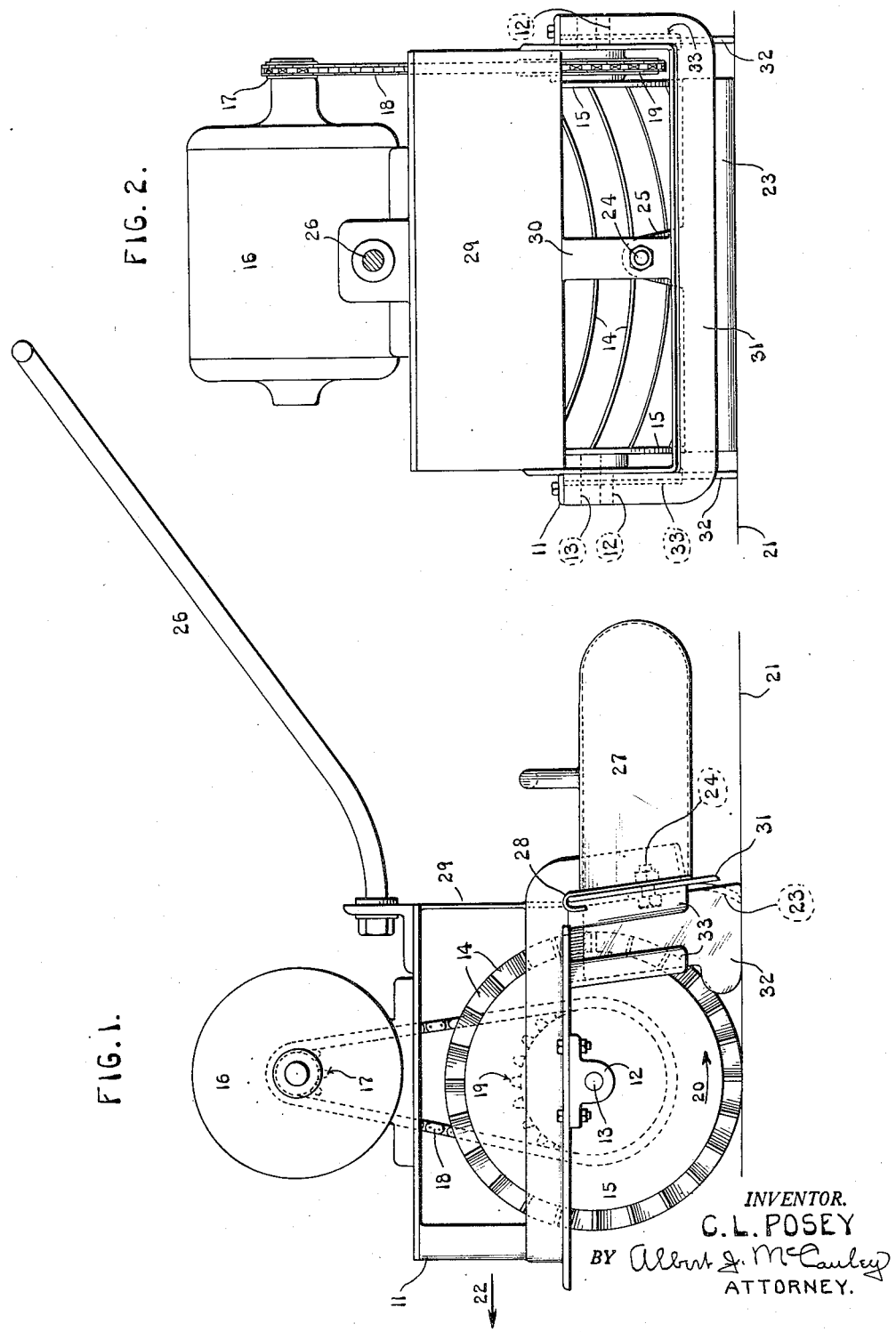

Patented Mar. 20, 1951

2,545,827

UNITED STATES PATENT OFFICE 2,545,827

SCRAPING MACHINE

Calvin L. Posey, Memphis, Tenn.

Application August 21, 1946, Serial No. 691,993

1 Claim. (Cl. 15—93)

This invention relates to scraping machines, and particularly to a motor-driven machine wherein a rotary scraper is forcibly driven to propel the machine over the surfaces to be scraped.

One of the objects is to produce a machine of this type wherein the motor-driven rotary scraper very effectively performs a violent grinding operation, with the result of forming a comparatively rough or non-uniform surface which is forcibly smoothed by a traveling scraper at the rear of the rotary scraper. The violent preliminary scraping operation of the rotary scraper is quite desirable in the forcible removal of hard surface crusts, such as the hard, slippery layers of oil, grease, and dirt which accumulate on the floors of railroad roundhouses, garages, etc.

A further object is to produce a simple regulating means associated with the rear scraper to control the forcible grinding and digging operations of the rotary front scraper, thereby providing for varying degrees of rough scraping at the rotary scraper, while continually smoothing the irregular surface formed by said rotary scraper.

In the preferred form of the invention, the rotary scraper is driven by a motor to propel the machine over surfaces to be scraped, and when the rear scraper is separated from the floor surface, said rotary scraper will idly roll over the floor, so as to drive the machine from one location to another, without performing any scraping operation. This idle rolling movement is quite desirable in moving the heavy machine under conditions wherein no scraping action is desired.

However, when the machine is in service, the rear scraper is forcibly depressed onto the surface to be scraped, thereby serving as a brake to reduce the forward speed of the machine, and causing the rotary scraper to forcibly perform its scraping functions. In other words, when the machine is retarded by downward brake pressure transmitted to the bottom of the rear scraper, the rotating front scraper will slip or spin on the surface to be scraped. The degree of downward pressure at the rear scraper can be conveniently controlled by a suitable regulating handle extending from the machine, so as to regulate the forward speed of the machine, thereby regulating the slippage at the rotary front scraper.

For example, if the rear scraper were depressed so forcibly that the machine could not move forwardly while the rotating front scraper contacts with a surface to be scraped, said front scraper would continuously exert its scraping functions at only one place. On the other hand, if the rear scraper were only very gently pressed onto a floor surface, it would not greatly retard the forward speed of the machine, and the resultant slight degree of slippage at the rotating scraper would not produce a very forcible scraping action. In actual practice, the degree of downward pressure at the rear scraper is regulated, as will be hereinafter described, thereby regulating the degree of slippage and scraping at the rotating scraper.

It will be observed that the rear scraper serves as a brake to control the slippage and resultant scraping action of the rotating scraper, while also serving as a means for smoothing the rough surface produced by the varying grinding and digging actions of the rotating scraper. Furthermore, the degree of downward pressure for the smoothing action at the rear scraper varies in accordance with variations in the slippage or prolonged scraping at the rotating scraper.

The rear scraper travels in the path of the rotary front scraper, and under some conditions the front scraper will contact with a surface at an angle to the surface at the rear scraper. For example, in traveling around the circularly dished floor of a railroad roundhouse, which slopes toward a central pit, the bottom of the front scraper will not be parallel with a radial line immediately below the rear scraper. Therefore, an object of the invention is to provide for effective scraping under conditions wherein said front and rear scrapers are parallel with each other, and also when they lie at an angle to each other. I will hereinafter describe a rear scraper that is freely tiltable to various inclined positions wherein its scraping edge conforms to inclinations of surfaces to be smoothed, irrespective of the inclinations of the rotary front scraper.

With the foregoing and other objects in view, the invention comprises the novel combination and arrangement of details herein shown and described. However, it is to be understood that the present invention extends to numerous variations and modifications within the scope of terms employed in the claim hereunto appended.

Fig. 1 is a side view of a scraping machine embodying features of this invention.

Fig. 2 is a rear view with the dirt catcher removed, a portion of the controlling handle being shown in section.

Fig. 3 is a fragmentary side view of a rotary scraper, showing only four of the numerous scraping blades and details associated therewith, portions of the side disks being broken away.

Fig. 4 is a rear view of the details shown in Fig. 3.

Fig. 5 is a detail view of the rear scraper which travels in the path of the rotary scraper.

Fig. 6 is an end view of the rear scraper.

Fig. 7 is a side view of another form of the rotary scraper.

Fig. 8 is a bottom view of the scraper shown in Fig. 7.

Fig. 9 is a rear view of one of the scraping blades shown in Fig. 7, with dotted lines indicating the shaft and side disks.

Fig. 10 is a perspective view of the detachable dirt catcher.

To illustrate one form of the invention I have shown a rigid frame 11 provided with bearings 12 to receive the central shaft 13 of a rotary scraper, said scraper being in the form of a roller having peripheral scraping blades 14. The ends of these blades may be secured to rotary side disks 15 in any suitable manner. A suitable means for driving this rotary scraper comprises a motor 16 provided with a sprocket wheel 17, and a sprocket chain 18 extending from said sprocket wheel 17 to a larger sprocket wheel 19 on the shaft 13. The motor 16 is supported by the frame 11 and it may be of any suitable type, preferably an electric motor or an internal combustion motor.

Said motor 16 is employed to forcibly rotate the circular scraper in the direction indicated by an arrow 20 in Fig. 1, thereby causing the machine to travel over a surface 21 in the direction indicated by an arrow 22 at the left of Fig. 1. However, in the absence of any retarding means, the rotary scraper would idly roll over a floor without exerting any scraping action.

Therefore, an important detail appears in a rear scraper 23 contacting with the surface 21 to prevent free rolling movement of the rotary front scraper. This rear scraper 23 (Figures 1, 2, 5 and 6) has a bottom edge normally forced into scraping contact with the surface 21, so as to perform a supplemental scraping function, while serving as a brake to retard the forward movement of the machine, thereby causing the rotating front scraper to slip or spin on the surface 21 and produce a forcible scraping action. The degree of scraping at the rotating scraper will depend partly upon the braking or retarding effect of the rear scraper 23. When this rear scraper is very forcibly depressed onto the surface to be scraped, its braking effect will greatly reduce the forward speed of the machine, and correspondingly increase the degree of scraping slippage at the rotating scraper. Consequently, the degree of scraping can be varied or regulated by merely varying the downward pressure at the rear scraper 23. This will vary the forward speed of the machine while varying the scraping action at both scrapers.

The rotating front scraper produces a rather violent chopping and grinding action on the surface to be scraped, thereby rapidly cutting into relatively hard surface crusts such as are found in railroad roundhouses, shops, streets, roofs, etc., while the rear scraper effectively performs the function of smoothing the rough surface formed by the rotating scraper.

To illustrate a desirable form of this rear scraping device, and without limiting the invention to its details, except as specified in the claim, I have shown an elongated smoothing blade 23 having a straight scraping edge located in the path of the rotary scraper so as to extend across said path and continuously exert its smoothing action, while also serving as a brake to regulate the rough scraping at the rotating scraper. In this specific form of the invention, the smoothing blade 23 is tiltably secured by means of a pivot 24 passing through a lug 25 which extends upwardly from the middle portion of said blade 23, as shown in Figures 1, 2, 5 and 6. This blade 23 is tiltable to various inclined positions wherein its bottom scraping edge conforms to inclinations of surfaces to be smoothed, regardless of variations in the inclination of the rotary front scraper.

More specifically stated, the rotary scraper is freely tiltable to maintain its bottom in effective scraping contact with varying inclines of surfaces to be scraped. The frame structure 11 is supported on the shaft 13 of the rotary scraper, so this frame will tilt with the rotary scraper, and the motor 16 will tilt with said frame. However, the pivotally mounted rear scraper 23 is tiltable about the axis of its pivot 24 to effective scraping positions at various angles with relation to the bottom of the rotary scraper.

It will also be noted that the entire frame structure 11 is pivotally supported on the central shaft 13 of the rotary scraper, and that a handle 26 (Fig. 1) extends upwardly and rearwardly from this pivoted frame so as to serve as a lever for raising and lowering the rear portion of said frame about the axis of the shaft 13. The handle 26 can be employed to steer the motor-driven machine, and said handle can be moved upwardly to lift the rear scraper 23 from the surface 21, thereby allowing the rotary scraper to roll idly over said surface without exerting any scraping action at either of the scrapers.

Furthermore, said handle 26 constitutes a regulating member associated with the pivoted frame 11 and rear scraper 23 to regulate the forward speed of the machine. For example, as a regulating member, the handle 26 can be depressed to forcibly depress the rear scraper 23 into braking contact with a surface to be scraped, thereby retarding the machine and causing the rotary scraper to forcibly perform its scraping functions. The downward braking pressure at said rear scraper is variable in response to variations in the downward pressure of the regulating handle 26, so as to provide the desired selected degree of scraping at said rotary scraper.

In Figures 1 and 10, I have shown a dirt receptacle 27 having extended hooks 28 whereby it is detachably secured to the rear of the machine, said receptacle being open at the front to receive scrapings which are thrown upwardly and rearwardly from the rotary scraper. A baffle plate 29 (Figures 1 and 2) is located above the open end of the receptacle 27 to limit the rearward motion of dirt particles that may be thrown to relatively high elevations. The rear scraper 23 abuts against the front faces of rigid frame members 30 and 31, shown in Figures 1 and 2, the member 30 being arranged between and welded to the members 29 and 31, so as to provide firm seats for the rear face of the pivoted scraper 23.

The machine also includes a pair of side shields 32 in the form of approximately vertical plates slidable in approximately vertical guides 33 at opposite sides of the machine. These loose side shields are free to drop by gravity into traveling contact with the surface 21 in advance of the rear scraper 23 and near the rear of the rotary scraper, so as to prevent scattering of dirt which is thrown onto said shields.

Attention is now directed to specific details of the peripheral scraping blades 14 shown in Figures 1 to 4 inclusive. Each of these scraping blades is in the form of an elongated bow having its ends arranged in advance of its middle portion, so as to provide for progressive scraping, beginning at the ends of the bowed scraping edge and continuing to the middle of said edge. This specific condition positively provides for highly desirable continuous, progressive scraping, which is prolonged at each blade, and the several blades are so close to each other that each blade begins its progresive scraping immediately before the preceding blade has completed its scraping operation. Instead of being parallel with the axis of the rotary scraper, the bowed scraping edges are inclined with relation to said axis, as shown in Fig. 2 and at the middle portion of Fig. 4, and these bowed edges tend to deflect scrapings toward the middle portion of the path of the scraper.

A highly desirable condition shown most clearly at the lower portions of Figures 3 and 4 appears in the fact that each of these scraping edges lies in oppositely inclined lines converging from the ends to the middle portion of the scraping edge and so arranged that when the middle of the elongated scraping edge contacts with a level surface 21, as shown at 34 in Fig. 4, the ends of said scraping edge will be separated from said level surface, as shown at 35.

In Figures 3 and 4 the peripheral scraping blades 14 are attached to the rotary side disks 15 and adjustable outwardly to compensate for abrasion at the inclined scraping edges. This adjustable attachment comprises lugs 36 carried by the disks to form seats for end portions of the blades, and bolts 37 which pass through said lugs and also through holes in the blades. Additional holes 38 are formed in the blades to provide for adjustment of the scraping blades.

In Figures 7, 8 and 9 I have shown a rotary scraper wherein each peripheral scraping blade 14' has an elongated, continuous scraping edge inclined with relation to the axis of the rotary scraper, as shown in Fig. 8, to provide for progressive scraping contact along each edge. To illustrate another condition found in each blade, the lowermost blade has been designated A in Figures 7, 8 and 9. Study of this blade A, particularly in Fig. 9, will show that its elongated scraping edge appears in oppositely inclined lines converging from the ends to the middle portion of said elongated scraping edge and so arranged that when the middle of the scraping edge contacts with a level surface 21, as shown at 34' in Fig. 9, the ends of said scraping edge will be separated from said level surface, as shown at 35'.

All of the peripheral blades 14 and 14' are preferably made of yieldable spring metal which extends outwardly beyond the rotary side disks 15, so as to provide extended scraping margins adapted to yield slightly in forcibly striking hard obstructions which may unexpectedly appear in deep floor crusts, or at the surfaces of deformed floors made of bricks or wooden blocks.

I claim:

A scraping machine comprising a substantially cylindrical rotary front scraper having a central drive shaft and peripheral scraping blades adapted to engage a surface to be scraped, a frame pivotally supported on said central drive shaft, a motor carried by said pivoted frame to drive said rotary front scraper and thereby propel the machine over the surface to be scraped, a rigid brake member to selectively regulate the scraping action of said rotary front scraper, said rigid brake member comprising a rear scraper consisting of a rigid blade pivoted to said pivoted frame and located at the rear of said rotary front scraper, the axis of the blade pivot being substantially horizontal and in a vertical plane that is perpendicular to the axis of said rotary front scraper, said pivoted frame being movable about the axis of its own pivot to raise and lower said rear scraper, and a regulating handle carried by the pivoted frame and movable to forcibly depress said pivoted rear scraper into braking contact with a surface to be scraped, thereby retarding the machine and causing the rotary front scraper to perform its scraping functions, the machine being solely supported by said rotary scraper when said rear scraper is separated from said surface, and said rear scraper being freely tiltable about the axis of its pivot to effective scraping positions at various angles differing from inclinations of the bottom of said rotary scraper.

CALVIN L. POSEY.

REFERENCES CITED

The following references are of record in the file of this patent:

UNITED STATES PATENTS

| Number | Name | Date |
|---|---|---|
| 107,943 | More | Oct. 4, 1870 |
| 384,704 | Merrill | June 19, 1888 |
| 451,118 | Evans | Apr. 28, 1891 |
| 1,009,734 | Friedlander | Nov. 28, 1911 |
| 1,059,136 | Gafney | Apr. 15, 1913 |
| 1,438,362 | Conley | Dec. 12, 1922 |
| 1,583,823 | Alexander | May 11, 1926 |
| 1,636,863 | Jehle | July 26, 1927 |
| 1,663,059 | Peterson | Mar. 20, 1928 |
| 1,786,096 | Thielman | Dec. 23, 1930 |
| 1,867,629 | Ponselle | July 19, 1932 |

FOREIGN PATENTS

| Number | Country | Date |
|---|---|---|
| 75,528 | Sweden | Aug. 10, 1928 |
| 841,387 | France | Feb. 6, 1939 |